INVENTOR.
Robert L. Larson
BY C.R. Meland
HIS ATTORNEY

INVENTOR.
Robert L. Larson
BY
C. R. Meland
HIS ATTORNEY

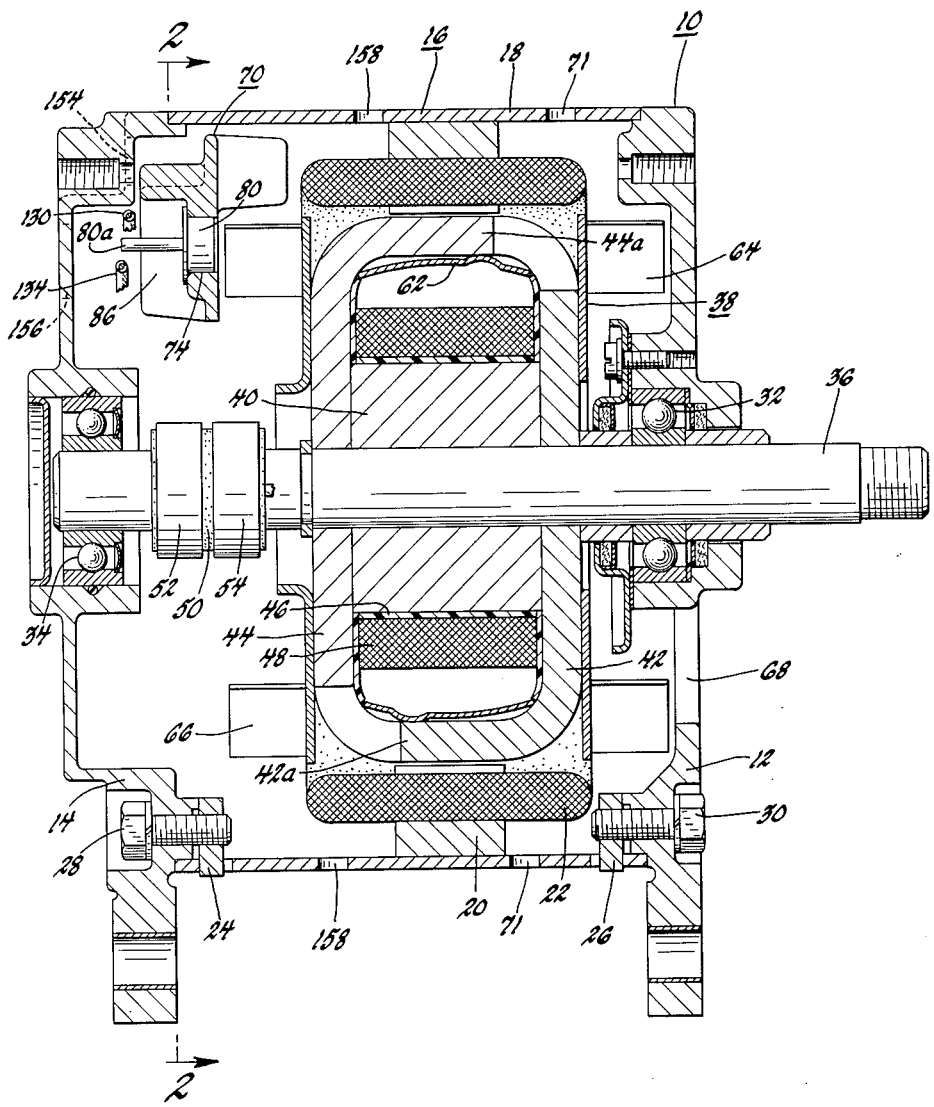

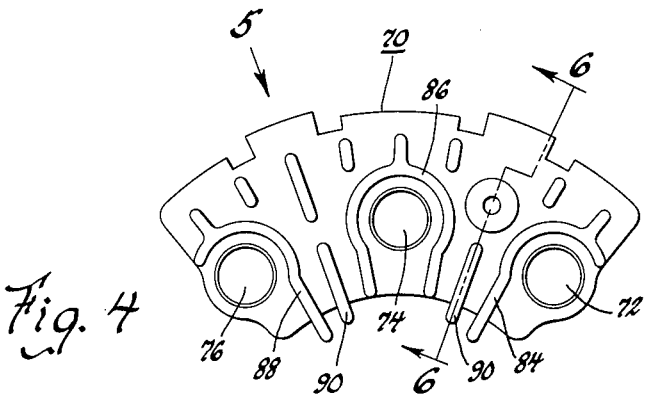
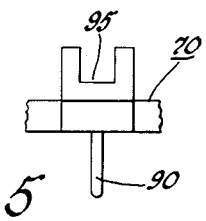
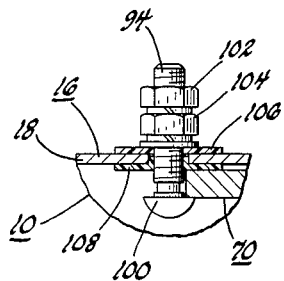
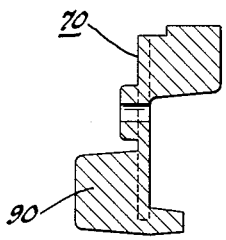
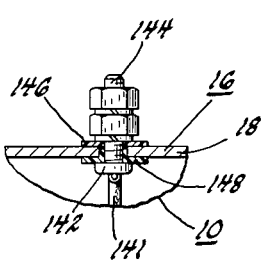
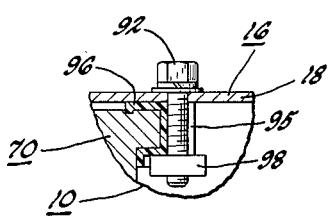

United States Patent Office 3,198,972
Patented Aug. 3, 1965

3,198,972
DYNAMOELECTRIC MACHINE
Robert L. Larson, Anderson, Ind., assignor to General Motors Corporation, Detroit, Mich., a corporation of Delaware
Filed Aug. 3, 1961, Ser. No. 129,001
11 Claims. (Cl. 310—68)

This invention relates to dynamoelectric machines, and more particularly to a dynamoelectric machine that has an alternating current output winding connected with built-in diodes.

One of the objects of this invention is to provide a dynamoelectric machine that has an alternating current output winding connected with a plurality of diodes mounted in one or more metal heat sink members, the heat sink members being so constructed as to prevent salt spray and other corrosive substances from contacting parts of the diodes that are susceptible to destruction by salt spray and similar substances.

Another object of this invention is to provide a dynamoelectric machine of the type described wherein the diodes are mounted in heat sinks and wherein air is circulated through the machine to cool the heat sinks and other parts of the machine but wherein the air is substantially prevented from contacting parts of the diodes that are vulnerable to eventual destruction by substances carried by the cooling air.

Another object of this invention is to provide a heat sink assembly for a dynamoelectric machine that comprises a block of metal material having spaced openings, each of which receives a diode, the openings being at least partially encircled by projecting air directing ribs that prevent corrosive substances from contacting the vulnerable parts of the diodes.

Further objects and advantages of the present invention will be apparent from the following description, reference being had to the accompanying drawings, wherein a preferred embodiment of the present invention is clearly shown.

In the drawings:

FIGURE 3 is a sectional view taken along line 3—3 of FIGURE 1.

FIGURE 4 is a plan view of one of the heat sink assemblies that is used in the dynamoelectric machine shown in FIGURES 1 through 3.

FIGURE 5 is a partial end view of the heat sink illustrated in FIGURE 4 and looking in the direction of the arrow designated by reference numeral 5 in FIGURE 4.

FIGURE 6 is a sectional view taken along line 6—6 of FIGURE 4.

FIGURE 7 is a sectional view taken along line 7—7 of FIGURE 1.

FIGURE 8 is a sectional view taken along line 8—8 of FIGURE 1.

FIGURE 9 is a sectional view taken along line 9—9 of FIGURE 1.

Figure 1:
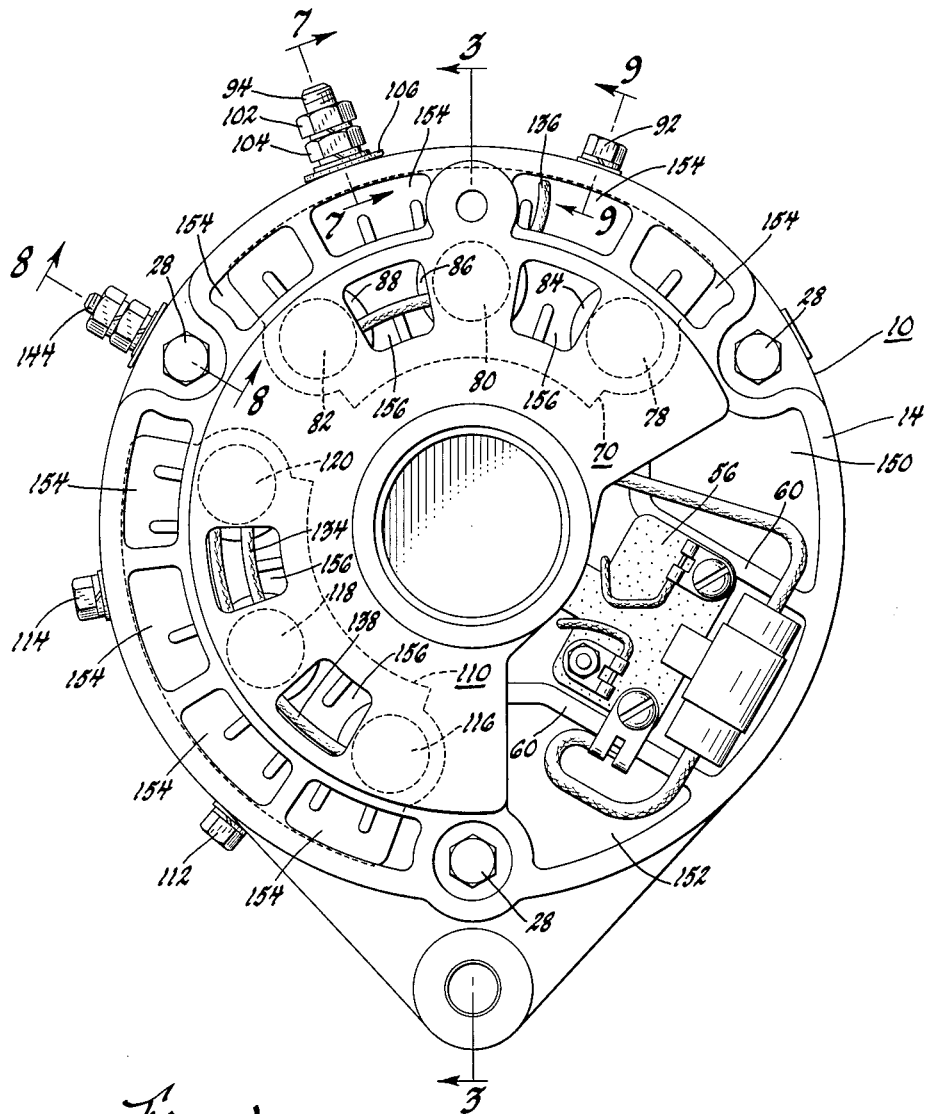
FIGURE 1 is an end view of a dynamoelectric machine made in accordance with this invention.

Referring now to the drawings and more particularly to FIGURE 3, the reference numeral 10 generally designates a dynamoelectric machine made in accordance with this invention. The dynamoelectric machine 10 comprises an alternating current generator that has built-in rectifiers for rectifying the output voltage coming from the stator winding. The machine has end frames 12 and 14 formed of die cast aluminum or other metal material which are secured to a stator assembly generally designated by reference numeral 16. The stator assembly 16 includes a tubular housing 18 which is formed of a magnetic material such as steel. The tubular housing 18 supports stator laminations 20 and these laminations carry a stator winding which in this case is a three phase Y-connected stator winding 22. The end frames 12 and 14 are held to the stator assembly 16 by the mounting lugs 24 and 26 which cooperate with the fasteners 28 and 30. The mounting lugs 24 and 26 fit within openings formed in the tubular housing 18 and it is seen that the mounting lugs have threaded openings which receive the bolts 28 and 30. When the bolts are fully tightened the end frames 12 and 14 are held in tight engagement with the tubular housing 18.

The end frame 12 carries a ball bearing assembly 32 and in a similar fashion the end frame 14 carries a ball bearing assembly 34. The bearings 32 and 34 journal a shaft 36 which forms a part of a rotor assembly which is generally designated by reference numeral 38.

The rotor assembly 38 includes a shaft 36, a metal core member 40 formed of magnetic material which is press fitted on the shaft 36 and a pair of pole members 42 and 44 which are likewise press fitted on the shaft 36. The pole member 42 has a plurality of circumferentially spaced axially extending fingers 42a which interleave with like fingers 44a of pole member 44. The magnetic core 40 carries a coil form 46 formed of insulating material and on this coil form is wound a field coil winding 48.

The shaft 36 carries a member 50 formed of electrical insulating material and the member 50 carries slip rings 52 and 54 which cooperate with brushes supported in a brush holder 56. One of these brushes is illustrated in the sectional view of FIGURE 2 and is designated by reference numeral 58. The brush holder 56 is supported by bosses or ribs 60 formed integral with the end frame 14 which as pointed out hereinbefore is formed of die cast aluminum material. A noise suppressor 62 engages the interleaved fingers of the pole members 42 and 44 and is formed of a non-magnetic materal such as aluminum. The noise suppressor is annular in configuration and exerts a pressure on the fingers of the pole members 42 and 44.

The pole member 42 carries a fan 64 and in a similar fashion the pole member 44 carries a fan 66. The fan 64 will draw air into the dynamoelectric machine through the air inlet openings 68 formed in the end frame 12. This air exits through air outlet openings 71 which are formed in the tubular housing 18. The air outlet openings 71 are circumferentially spaced around the tubular member 18.

It will be appreciated by those skilled in the art that if the field winding 48 is supplied with direct current an alternating current will be induced in the stator winding 22 as the rotor assembly 38 rotates. The alternating current which is generated in the stator winding 22 is rectified to direct current by a three phase full wave bridge rectifying network which is now to be described.

Figure 2:
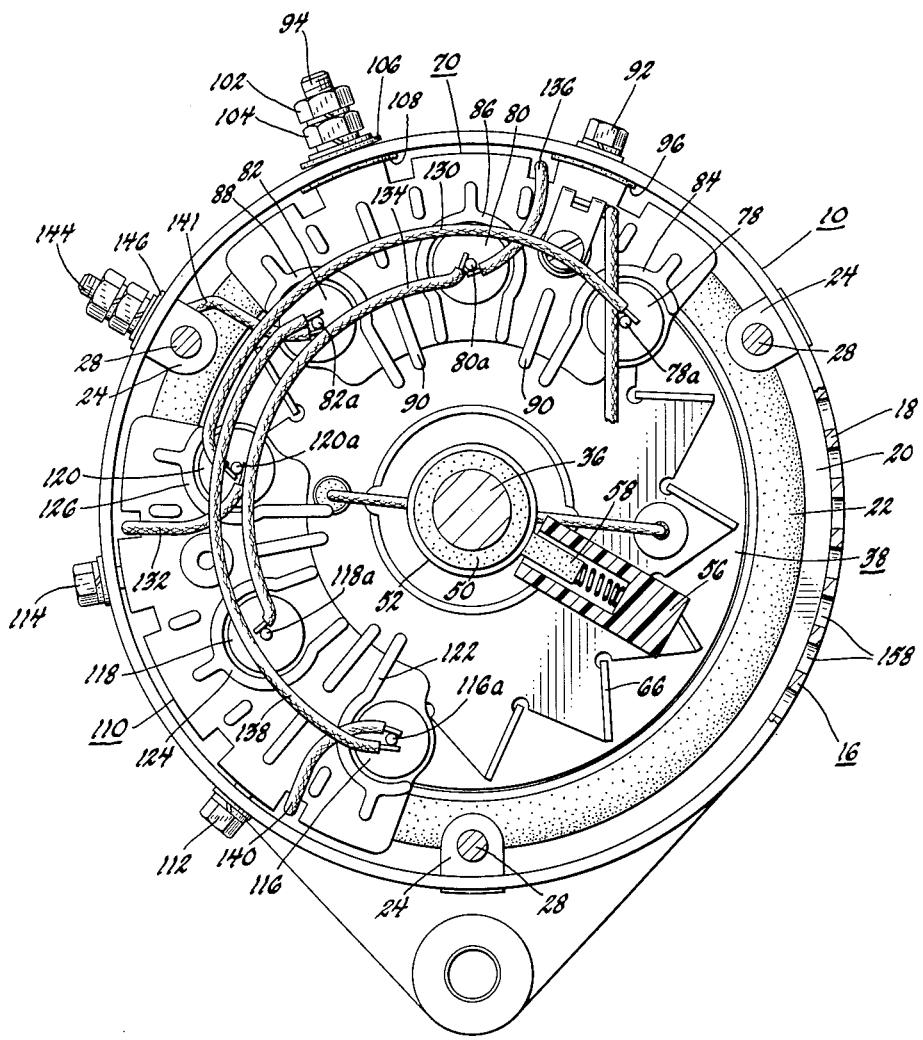
FIGURE 2 is a sectional view taken along line 2—2 of FIGURE 3.

Referring now more particularly to FIGURE 2, it is seen that the tubular housing member 18 supports a metal heat sink member designated in its entirety by the reference numeral 70. The metal heat sink member 70 is formed of a metal material such as die cast aluminum and as can be seen from FIGURES 2 and 4 has a generally arcuate configuration. The heat sink member 70 has three openings 72, 74 and 76 which receive the diodes 78, 80 and 82. The diodes 78, 80 and 82 are of the PN junction semi-conductor type and are preferably of the silicon type. These diodes each have an outer metal case and relatively stiff projecting terminals 78a, 80a and 82a. The outer metal cases of the diodes are generally cup-shaped and a hermetic seal of insulating material is disposed between the metal cases and the projecting terminals 78a, 80a and 82a. The metal cases of the diodes form one electrical terminal for one side of the rectifying junction whereas the terminals 78a, 80a and 82a are the other terminal side of the rectifying junction carried within the metal cases of the diodes. These diodes are well known to those skilled in the art and are presently commercially available on a large scale. The diodes are press fitted into the openings 72, 74 and 76 with the outer metal cases of the diodes contacting the internal walls of these openings.

The heat sink 70 is formed with projecting air directing ribs 84, 86 and 88 which partially encircle or outline the diode openings and the diodes when they are in place in the openings. The projecting rib 86 is generally horseshoe-shaped whereas the projecting ribs 84 and 88 encircle only one side of the diode openings 72 and 76. The heat sink member 70 also is formed with generally straight radially extending ribs 90 which are clearly illustrated in FIGURES 2 and 4. The raised ribs on the heat sink 70 perform two functions, namely they prevent direct contact of cooling air with portions of the diodes 78, 80 and 82 and also form heat radiating ribs for the heat sink member 70. These functions are more fully described hereinafter.

The heat sink member 70 is held in place by a bolt 92 and by a terminal stud 94. The bolt 92 is best illustrated in the sectional view of FIGURE 9 and it can be seen that it passes through an opening in housing 18 and through a slot 95 formed in the heat sink member 70. The heat sink member 70 is insulated from the tubular housing 18 by insulating material 96 and a nut 98 threaded onto the bolt 92 engages the insulating material to hold the heat sink in fixed position with respect to the tubular housing 18.

The terminal stud 94 is best illustrated in the sectional view of FIGURE 7 and it is seen that this terminal stud has a head 100 which engages a portion of the heat sink 70. The terminal stud 94 threadedly engages the nuts 102 and 104 and is insulated from the tubular housing 18 by the insulating washers 106 and 108. These insulating washers 108 and 106 serve to insulate the terminal stud 94 from the tubular housing 18. It is seen however that the terminal stud 94 is electrically connected with the metal heat sink 70 by virtue of the engagement of head 100 with the heat sink 70.

A second heat sink generally designated by reference numeral 110 is provided which like the heat sink member 70 is supported by the tubular housing 18. The heat sink member 110 is substantially identical to the heat sink member 70 and is fixed to the tubular housing 18 by bolts 112 and 114 which are not electrically insulated from either the heat sink 110 or the tubular housing 18. The tubular housing is therefore at the same electrical potential as the heat sink 110. The heat sink 110 has openings which receive the diodes 116, 118 and 120. These diodes are identical with diodes 78, 80 and 82 with the exception that the rectifying junction is reversed or in other words the metal cases of the diodes are at an opposite electrical potential to the outer metal cases of the diodes 78, 80 and 82. The diodes 116, 118 and 120 have relatively stiff projecting terminals 116a, 118a and 120a. The diodes in the heat sink 110 are partially encircled by the air directing ribs 122, 124 and 126 which are identical with the air directing ribs of the heat sink 70. It can be seen that the heat sink 110 also has straight radially extending ribs similar to the ribs 90 of heat sink 70.

The projecting terminal 78a of diode 78 is connected with terminal 120a of diode 120 via lead wire 130. The terminal 120a is connected with one of the phase windings of the three phase stator winding 22 by a conductor 132. In a similar fashion the terminal 80a of diode 80 is connected with terminal 118a of diode 118 by a lead wire 134. The terminal 80a is connected with another phase winding of the Y-connected stator winding by the lead wire 136. The terminal 82a of diode 82 is connected with terminal 116a of diode 116 by a lead wire 138. The terminal 116a is connected with another phase winding of the stator winding 22 by lead wire 140.

The treminal 82a of diode 82 is connected with lead wire 141 and this lead wire is connected with the head 142 of a terminal stud 144 which is best illustrated in the sectional view of FIGURE 8. The terminal stud 144 passes through an opening formed in the tubular housing 18 and is insulated from this opening by insulating washers 146 and 148. The terminal stud 144 is thus electrically connected between the terminals of diodes 82 and 116 and this terminal stud together with one of the output terminals of the bridge rectifier network formed by the diodes may be used to actuate a relay or other device if so desired.

It will be appreciated from the foregoing that the particular mounting of the diodes in the heat sinks and their electrical connections with the stator winding provides a three phase full wave bridge rectifier network. The output terminals of the bridge rectifier network are terminal stud 94 connected with heat sink 70 and the frame of the dynamoelectric machine which is connected with heat sink 110. It thus is apparent that the heat sinks 70 and 110 will be at different direct current polarities and form common electrical connections for the cases of the diodes which they support.

Referring now more particularly to FIGURE 1, it is seen that the end frame 14 has large air inlet openings 150 and 152 disposed on opposite sides of the ribs 60 and has circumferentially spaced air inlet openings 154. In addition, the end frame 14 is formed with circumferentially spaced air inlet openings 156 which are located inwardly of the air inlet openings 154. It is pointed out that the air inlet openings 154 are positioned over areas of the heat sinks 70 and 110 which are located at the outer extremities of the heat sinks and also entirely outside of the air directing ribs 84, 86 and 88 on heat sink 70 and outside of the ribs 122, 124 and 126 on the heat sink 110. The air inlet openings 156 are positioned over areas of heat sinks 70 and 110 that are between the respective ribs that encircle the diodes and the diode openings. It thus is seen that air drawn in to the air inlet openings 154 and 156 will contact areas of the heat sinks which are outside of the protecting ribs formed on the heat sinks. It is also pointed out that none of these air inlet openings are in direct ailgnment with the terminal sides of the diodes as is clearly apparent from the drawings.

Cooling air is drawn into the openings in the end frame 14 by the fan 66 and is exhausted from the generator through outlet air openings 158 formed in the tubular housing 18. These air outlet openings 158 are circumferentially spaced around the periphery of the tubular housing 18. It can be seen that when the air flows between the air inlet openings in end frame 14 and the outlet openings 158 it will contact the heat sinks 70 and 110 and will also serve to cool the stator winding 22. It is also seen that when the air enters the end frame 14 it will be flowing in an axial direction whereupon it will impinge upon the heat sinks 70 and 110. The air will then flow radially inwardly along the front surface of the heat sinks 70 and 110 and is directed in this radial path by the ribs that encircle the diodes and also by the straight radially extending ribs. The air will then flow under the lower edge of the heat sinks 70 and 110, then across the back sides of the heat sinks, then past the one end of the stator winding 22 and then out through the outlet openings 158. This cooling air is thus caused to contact three sides of the heat sinks 70 and 110 but is not permitted to directly contact the diodes mounted in the heat sinks. In this connection it is noted that the ribs 84, 86 and 88 and also the ribs 122, 124 and 126 extend for a considerable distance in the axial direction and are actually longer than the cases of the diodes. This is best shown in FIGURE 3 where it can be seen that the projecting rib 86 projects substantially coextensively with the length 80a of the terminal and therefore affords good protection for the hermetic seal that is disposed between the terminal 80a and the metal case of the diode 80. The ribs that encircle the diodes and diode openings therefore prevent corrosive materials from being splashed onto the diodes or from being carried by cooling air onto the diodes where they might cause eventual destruction or shorting of the diodes between the projecting terminals and the metal cases of the diodes. It thus is seen that the ribs do not impede movement of the cooling air through the generator to any great extent but do protect the diodes from destructive substances that might be carried by the cooling air through the machine.

While the embodiment of the invention as herein disclosed constitutes a preferred form, it is to be understood that other forms might be adopted.

What is claimed is as follows:

1. In combination, an alternating current generator having an output winding, a heat sink member formed of metal material supported by said generator, an opening in said heat sink member, a semi-conductor diode positioned in said opening, rib means projecting from an outer surface of said heat sink member at least partially encircling said diode opening, and means electrically connecting said output winding with said diode.

2. In combination, an alternating current generator having an output winding, said generator having air inlet and air outlet openings, impeller means for causing a circulation of air between said air inlet openings and said air outlet openings, a heat sink member formed of metal material supported by said generator having at least one opening, a diode of the semi-conductor type positioned in said opening in said heat sink member, rib means integral with said heat sink member for preventing direct contact of the air with said diode, and means electrically connecting said output winding with said diode.

3. In combination, an alternating current generator having an output winding, air inlet and air outlet openings for said generator, air impelling means for circulating air between said inlet and outlet openings, a metal heat sink member positioned between said air inlet and air outlet openings, one face of said metal heat sink member forming a part of the air flow path between said inlet and outlet openings, a diode mounted in said metal heat sink member, and rib means integral with said metal heat sink member for preventing the direct contact of air with said diode, and means electrically connecting said output winding with said diode.

4. In combination, an alternating current generator having an output winding, a first metal heat sink member supported by said generator, a second metal heat sink member supported by said generator, air inlet and air outlet openings for said generator, impeller means for causing a circulation of air between said air inlet and said air outlet openings, said heat sink members being positioned between said air inlet and air outlet openings, a first group of diodes of one polarity mounted in said first heat sink member, a second group of diodes of an opposite polarity mounted in said second heat sink member, rib means on each of said heat sink members for preventing contact of said air with said diodes when said air flows between said inlet and outlet openings, and means electrically connecting said output winding with said diodes.

5. In combination, an alternating current generator having an output winding, said generator having an end frame, a metal heat sink member supported by said generator, a semi-conductor diode mounted in said metal heat sink member, an air inlet opening formed in said end frame located in alignment with said heat sink member and out of alignment with said diode, an air outlet opening, impeller means for causing a circulation of air between said air inlet and said air outlet opening, rib means at least partially encircling a portion of said diode, and means electrically connecting said diode with said output winding.

6. In combination, an alternating current generator having an output winding and an end frame, a metal heat sink member supported by said generator, said heat sink member carrying a semi-conductor diode that has a terminal lead which faces said end frame, said heat sink member having a surface facing said end frame, an air inlet opening in said end frame located in alignment with a portion of said heat sink member and out of alignment with said diode, an air outlet opening, air impelling means for causing a circulation of cooling air between said inlet opening and said air outlet opening, means electrically connecting said output winding with said diode, and rib means projecting from said surface toward said end frame at least partially encircling a part of said diode.

7. In combination, an alternating current generator having an output winding and an end frame, a metal heat sink member supported by said generator having a surface facing said end frame, at least one opening in said metal heat sink member, rib means integral with said heat sink member extending from said surface toward said end frame outlining said opening and positioned partially around said opening, a semi-conductor diode having an outer metal case fitted within said opening, means electrically connecting said output winding with said diode, and an air inlet opening in said end frame positioned in alignment with at least a portion of said heat sink member but out of alignment with said diode.

8. In combination, an alternating current generator having an output winding and an end frame, first and second metal heat sink members supported by said generator, said heat sink members each having a surface facing said end frame, a plurality of openings in each of said heat sink members, rib means extending from said surfaces of said heat sink members and at least partially outlining said openings, a first group of semi-conductor diodes of a first polarity mounted in the openings of said first heat sink member, a second group of semi-conductor diodes of an opposite polarity mounted in the openings of said second heat sink member, air inlet openings formed in said end frame located in alignment with areas of said heat sink members located between said rib means, and means electrically connecting said diodes together and with said output windings.

9. In combination, an alternating current generator having an output winding and an end frame, a metal heat sink member supported by said generator, at least one opening in said metal heat sink member, a semi-conductor diode fitted within said opening, said diode having an outer metal case contacting the walls defining said opening and having a terminal lead projecting toward said end frame, means formed integral with said heat sink member at least partially encircling said terminal lead of said diode, and means electrically connecting said output winding with said diode.

10. In combination, an alternating current generator having an output winding and an end frame, first and second metal heat sink members supported by said generator, each of said heat sink members having a plurality of spaced openings, a first group of semi-conductor diodes of a first polarity mounted in the openings of said first metal heat sink member, said diodes having an outer metal case contacting the walls defining said openings in said first heat sink member and having terminal leads projecting toward said end frame, a second group of semi-conductor diodes of an opposite polarity mounted in the openings in said second heat sink member, said second group of semi-conductor diodes each having an outer metal case contacting the walls of said openings in said second metal heat sink member and each having terminals projecting towards said end frame, rib means formed integral with each of said heat sink members and at least partially encircling the terminal leads of said diodes, air inlet openings formed in said end frames in alignment with areas of said heat sink members that are positioned between said rib means, and means electrically connecting said diodes together and with said output winding.

11. A diode assembly for rectifying the output voltage of an air-cooled alternating current generator comprising, a metal heat sink having an outer surface and a plurality of spaced openings, a plurality of semiconductor diodes each having an outer metal case and a projecting terminal, said projecting terminal being electrically insulated from said outer metal case, the outer metal cases of said diodes being respectively positioned in said openings with said metal cases being in direct metal to metal contact with the walls defining said openings, and air directing ribs extending from said outer surface of said heat sink member and at least partially encircling said openings, said diodes being so-positioned that said air-directing ribs encircle at least a portion of said projecting terminals, said ribs being adapted to direct cooling air around said openings and around the terminal end of said diodes when said diode assembly is mounted in an air cooled alternating current generator.

References Cited by the Examiner

UNITED STATES PATENTS

| | | | |
|---|---|---|---|
| 2,984,774 | 5/61 | Race | 317—234 |
| 3,011,105 | 11/61 | Le Blanc | 317—234 |

MILTON O. HIRSHFIELD, *Primary Examiner.*

ORIS L. RADER, *Examiner.*